United States Patent
Hellemans et al.

(10) Patent No.: US 12,485,379 B2
(45) Date of Patent: Dec. 2, 2025

(54) DRYER FOR COMPRESSED GAS, COMPRESSOR INSTALLATION PROVIDED WITH A DRYER AND A METHOD FOR DRYING COMPRESSED GAS

(71) Applicant: ATLAS COPCO AIRPOWER N.V., Wilrijk (BE)

(72) Inventors: Geert Hellemans, Wilrijk (BE); Thibault Crepain, Wilrijk (BE)

(73) Assignee: ATLAS COPCO AIRPOWER N.V., Wilrijk (BE)

( * ) Notice: Subject to any disclaimer, the term of this patent is extended or adjusted under 35 U.S.C. 154(b) by 774 days.

(21) Appl. No.: 17/622,972

(22) PCT Filed: Aug. 14, 2020

(86) PCT No.: PCT/IB2020/057661
§ 371 (c)(1),
(2) Date: Dec. 27, 2021

(87) PCT Pub. No.: WO2021/033099
PCT Pub. Date: Feb. 25, 2021

(65) Prior Publication Data
US 2022/0241718 A1    Aug. 4, 2022

(30) Foreign Application Priority Data

Aug. 16, 2019  (BE) .................................. 2019/5535
Aug. 16, 2019  (BE) .................................. 2019/5537
(Continued)

(51) Int. Cl.
*B01D 53/02* (2006.01)
*B01D 53/06* (2006.01)
*B01D 53/26* (2006.01)

(52) U.S. Cl.
CPC ........... *B01D 53/06* (2013.01); *B01D 53/261* (2013.01); *B01D 2257/80* (2013.01); *B01D 2259/40001* (2013.01); *B01D 2259/4009* (2013.01)

(58) Field of Classification Search
CPC ............ B01D 2257/80; B01D 2258/06; B01D 2259/40001; B01D 2259/4009; B01D 53/06; B01D 53/261
See application file for complete search history.

(56) References Cited

U.S. PATENT DOCUMENTS 5,385,603 A * 1/1995 Sienack .................. F04B 39/16
                                                              96/128
5,667,560 A    9/1997 Dunne
(Continued)

FOREIGN PATENT DOCUMENTS

CN     1077396 A    10/1993
CN   102481511 A     5/2012
(Continued)

OTHER PUBLICATIONS

International Search Report and Written Opinion in corresponding PCT Application No. PCT/IB2020/057661, dated Oct. 30, 2020.
(Continued)

*Primary Examiner* — Christopher P Jones
(74) *Attorney, Agent, or Firm* — BACON & THOMAS, PLLC

(57) ABSTRACT

A dryer for compressed gas includes a pressure vessel containing a drying zone and a regeneration zone, a drum within the rotation symmetrical part, equipped with a regenerable drying agent; driving means for rotating the aforementioned drum so that the drying agent is successively moved through the drying zone and the regeneration zone, an inlet for the supply of the compressed air to be dried to the drying zone, an outlet for the removal of the dried (Continued)

compressed gas, and a first connection line for branching off of a partial stream of the dried compressed gas and transfer of this partial stream to the regeneration zone. The drying zone is on outlet side is subdivided using a divider into a first outlet zone with which the outlet is connected for the dried compressed gas, and a second outlet zone with which the first connection line is connected.

22 Claims, 7 Drawing Sheets

(30) Foreign Application Priority Data

Aug. 16, 2019 (BE) .................................. 2019/5538
Aug. 16, 2019 (BE) .................................. 2019/5539

(56) References Cited

U.S. PATENT DOCUMENTS

| | | | | |
|---|---|---|---|---|
| 5,925,169 | A * | 7/1999 | Vertriest | F04B 39/16 95/126 |
| 6,029,462 | A * | 2/2000 | Denniston | B01D 53/261 62/271 |
| 6,447,583 | B1 * | 9/2002 | Thelen | B01D 53/261 96/125 |
| 2012/0125198 | A1 | 5/2012 | Vanderstraeten | |
| 2015/0251129 | A1 | 9/2015 | Heirman et al. | |
| 2020/0164301 | A1 | 5/2020 | Vertriest et al. | |
| 2022/0241720 | A1 * | 8/2022 | Hellemans | B01D 53/06 |
| 2022/0274054 | A1 * | 9/2022 | Crepain | B01D 53/261 |

FOREIGN PATENT DOCUMENTS

| | | |
|---|---|---|
| CN | 107970748 A | 5/2018 |
| EP | 3015778 A1 | 5/2016 |
| EP | 3431890 A1 | 1/2019 |
| JP | H05115736 A | 5/1993 |
| JP | H06-023228 A | 2/1994 |
| JP | 2004255350 A | 9/2004 |
| JP | 2007-517663 A | 7/2007 |
| JP | 2013-501604 A | 1/2013 |
| KR | 101520319 B1 | 5/2015 |
| WO | WO/0074819 A1 | 12/2000 |
| WO | 2015039193 A2 | 3/2015 |

OTHER PUBLICATIONS

First OA (Notification of Reason for Rejection) cited in corresponding Japanese Int'l Appln. No. 2022-503512 dated Apr. 22, 2024, with translation.
Chinese Office Action in corresponding Chinese Application No. 202010080229.6, dated Nov. 11, 2022.
PVC Production and Operation, compiled by Tianjin Chemical Plant, Fuel Chemical Industry Press, Mar. 1972, pp. 236-237.
Office Action issued Apr. 15, 2024, in corresponding Brazilian Application 112021025733-0.
Korean Office Action with English Translation cited in corresponding Korean Patent Appln. No. 10-2022-7005820 dated Aug. 2, 2025.

* cited by examiner

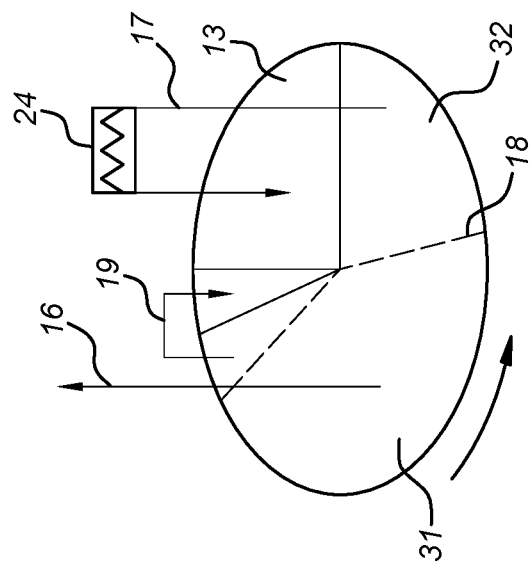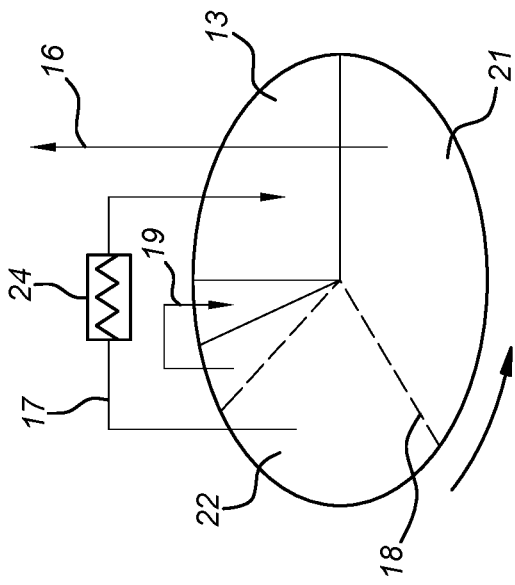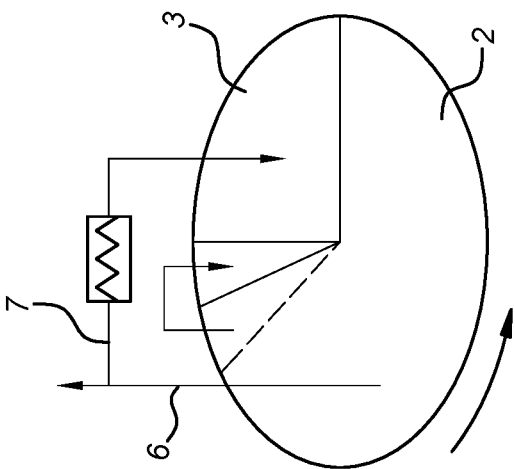

DRYER FOR COMPRESSED GAS, COMPRESSOR INSTALLATION PROVIDED WITH A DRYER AND A METHOD FOR DRYING COMPRESSED GAS

FIELD OF THE INVENTION

The current invention involves a dryer for compressed gas, a compressor installation provided with this type of dryer and a method for drying of the compressed gas, such as air.

BACKGROUND OF THE INVENTION

There are already dryers for compressed gas known, such dryers that are equipped with a pressure vessel with a drying zone and a regeneration zone and possibly a cooling zone, and a rotating drum in the pressure vessel with a regenerable drying agent. The pressure vessel contains an intake for the supply of the compressed gas to be dried to the drying zone and an outlet for the removal of dried gas. A warm regeneration gas is conducted to the regeneration zone for regeneration of the drying agent. The dryer also contains drive units for the rotation of the drum such that the drying agent subsequently moves through the drying zone and the regeneration zone.

The compressed gas heated by the compression and therefore has a low relative humidity, can be used as a regeneration gas for the regeneration of the drying agent. In a first known design, a part of the supply flow of the compressed gas is tapped off for the regeneration and then re-added to the flow of compressed gas via a connection line. In a second known design, a part of the supply flow of the compressed gas is tapped off and heated for the regeneration and then re-added to the flow of compressed gas via a connection line. In a third known design, the entire supply flow is to be dried, compressed gas is first conducted through the regeneration zone and then through the drying zone.

There are other designs known, such as in WO 2015/039193 A2.

SUMMARY OF THE INVENTION

One objective of the invention is to rectify one or more disadvantages of the state of the art.

It is also the objective of the invention to create a dryer, or drying unit for a compressed gas, with which the characteristics (e.g. pressure dew point) of the dried, compressed gas an/or the function (e.g. Efficiency) of the dryer can be improved.

It is an additional objective of the invention to create a dryer or drying unit for compressed gas that has a more compact structure.

The compressed gas is air, for example, but could also be another gas. The dried gas can be used in a downstream compressed air network for all kinds of uses, such as for pneumatic transport, driving of pneumatically driven tools and the like.

According to a first aspect, whether or not in combination with other aspects or designs described herein, the invention creates a dryer or drying unit for the drying of compressed gas, comprising a pressure vessel with a rotation symmetrical (such as cylindrical) part containing a drying zone and a regeneration zone, a drum within the rotation symmetrical part, equipped with a regenerable drying agent; driving means for rotating the aforementioned drum within the rotation symmetrical part, meaning for rotating the drum and/or the rotation symmetrical part, so that the drying agent is successively moved through the drying zone and the regeneration zone, an inlet for the supply of the compressed air to be dried to the drying zone, an outlet for the removal of the dried compressed gas, and a first connection line for branching off of a partial stream of the dried compressed gas and transfer of this partial stream to the regeneration zone. The drying zone is on outlet side is subdivided using a divider into a first outlet zone with which the outlet is connected for the dried compressed gas, and a second outlet zone with which the first connection line is connected. The first and second outlet zones are, in other words, separated parts or spaces within the pressure vessel on the outlet side of the drying zone.

The inventors have found that the subdividing of the outlet side of the drying zone in the first outlet zone and the second outlet zone, or in other words, the division of the partial stream used for regeneration and the stream of dried compressed gas transferred to the outlet is already in the position where the total stream of dried gas is expelled from the drum, the characteristics of the dried compressed gas transferred to the outlet can be improved or at least can be determined with more accuracy.

The inventors have also found that the subdividing of the outlet side of the drying zone in the first outlet zone and the second outlet zone, or in other words, the division of the partial stream used for regeneration and the stream of dried compressed gas transferred to the outlet is already in the position where the total stream of dried gas is expelled from the drum, can improve the function of the dryer. This can be achieved by, on the one hand, optimally using intrinsic heat in supplied compressed gas, and on the other hand, deep drying of the drying agent can be achieved, whereby the relative humidity of the compressed gas that leaves the dryer can be kept as low as possible. In addition, the invention can guarantee the dryer efficiency as optimally as possible in as many use conditions as possible.

The aforementioned, and other effects can be achieved by a certain choice of location of the first and second outlet zones with regard to each other with regard to their scope, as will be described below. Simulations have, for example, shown that through a prior determined choice of the location of the first and second outlet zones with regard to each other, and their scope and/or mutual proportions, the pressure dew point of the processed gas can be lowered and/or kept more stable.

In designs according to the invention, the first outlet zone, seen from the direction of rotation of the drum can be located in front of the second outlet zone. This means that the outlet for dried compressed gas is connected to the partial zone of the drying zone where relatively drier gas is expelled.

In designs according to the invention, the first outlet zone, seen from the direction of rotation of the drum can be located after the second outlet zone. This means that the first connection line for partial stream to the regeneration zone is connected to the partial zone of the drying zone where relatively dryer gas is expelled.

The dryer according to the invention can be equipped with positioning elements for the positioning of the first outlet zone, the second outlet zone and/or the divider on the outlet zone of the drying zone. With this type of positioning agents, for example, well determined positions or settings for the divider(s) that create the zones within the pressure vessel can be defined. In this way, the construction of the dryer is simplified.

In designs according to the invention, the regeneration zone and/or the second outlet zone can range over a sector of 45° to 135° from the drum. Preferably, the regeneration zone and the second outlet zone (partial stream for regeneration) range over sectors of nearly the same scope. The regeneration zone ranges preferably over a sector from 80° to 100°. The first outlet zone ranges preferably over a sector from 90° to 180°.

In designs according the invention the symmetrical rotation part can also have a cooling zone for cooling the drum, whereby the cooling zone, seen in the direction of rotation of the drum, is preferably at the located behind the regeneration zone and in front of the drying zone. Preferably, for this cooling, a partial stream is branched off, which preferably is transferred from the adjacent side of the drying zone to the cooling zone.

According to a second aspect, whether or not in combination with other aspects or designs described herein, the invention creates a dryer or drying unit for the drying of compressed gas, comprising a pressure vessel with a rotation symmetrical (such as cylindrical) part containing a drying zone and a regeneration zone, a drum within the rotation symmetrical part, equipped with a regenerable drying agent; driving means for rotating the aforementioned drum within the rotation symmetrical part, meaning for rotating the drum and/or the rotation symmetrical part, so that the drying agent is successively moved through the drying zone and the regeneration zone, an inlet for the supply of the compressed air to be dried to the drying zone, an outlet for the removal of the dried compressed gas, and a first connection line for branching off of a partial stream of the dried compressed gas and transfer of this partial stream to the regeneration zone. The first connection line is equipped with a heating unit for the heating of the partial stream branched off for the regeneration. The first connection line and the heating unit are located within the pressure vessel. By integrating the first connection line and the heating unit in to the pressure vessel, a more compact construction can be achieved.

In the design according to the invention, the heating element can be a heat exchanger, provided for heating the partial stream tapped-off for regeneration with the compressed gas to be dried supplied to the dryer.

In designs according to the invention, the inlet for the supply of the compressed gas to be dried to the dryer is located at the level of the heat exchanger and that within the pressure vessel there is a second connection line for the supply of the compressed gas to be dried from the heat exchanger to the inlet side of the drying zone. The integration of the second connection line within the pressure vessel can further contribute to a more compact construction of the dryer.

In designs according to the invention, the second connection line can be equipped with a venturi ejector for combining the partial stream used for regeneration with the stream of the compressed gas to be dried. The integration of the venturi eject within the pressure vessel can further contribute to a more compact construction of the dryer. The venturi ejector can be equipped with an adjustable opening and the dryer can include a driver for the control of the adjustable opening.

In designs according to the invention, the dryer also has a cooling unit for cooling of the supplied compressed gas to be dried, whereby the cooling element is located within the pressure vessel on the inlet side of the drying zone. The integration of the cooling element within the pressure vessel can further contribute to a more compact construction of the dryer.

Additional aspects of a dryer according to the invention are those presented below. An additional aspect of the invention involves a compressor installation, comprising a compressor and a dryer according to one of the aspects or designs described herein.

An additional aspect of the invention involves a method for drying a compressed gas, using a dryer according to one of the aspects or designs described herein.

BRIEF DESCRIPTION OF THE DRAWINGS

The invention will be explained in more detail using the drawings of the design examples according to the invention.

FIG. 3a-c shows a schematic comparison of the dryer according to the state of the art of technology with dryers according to the invention.

DETAILED DESCRIPTION OF THE INVENTION

The current invention will be described with regard to particular designs and with reference to certain figures, but the invention is not limited to these and is only determined by the conclusions. The figures described are only schematic and non-limiting. In the figures, the size of certain element is exaggerated an not drawn to scale for illustrative purposes. The dimensions and the relative dimensions are not necessarily consistent with actual practical designs of the invention.

In addition, the terms first, second, third and the like are used in the description an conclusions to differentiate between similar elements an not necessarily to describe a sequential or chronological sequence. The terms are interchangeable under fitting circumstances and the designs of the invention can be applied in sequences other than those described or illustrated here.

In addition, the terms, top, bottom, over, under an the like in the description and conclusions are used for illustrative purposes and not necessarily to describe relative positions. The terms used are interchangeable under fitting circumstances and the designs of the invention described can be applied in other orientations than described or illustrated here.

Furthermore, the various designs, even though called "preferred designs" must be considered rather as a manner of example of how the invention can be designed than as a limitation of the range of the invention.

The term "encompassing", used in the conclusions, must not be interpreted as being limited to the resources or steps listed after it. The term does not exclude other elements or steps. The term should be interpreted as specifying for the presence of the listed features, elements, steps or components which are referenced, but does not exclude the presence or addition of one or more other features, elements, steps or components or groups thereof. The range of the expression "a design encompassing resources A and B" must thus not be limited to designs that consist only of A and B. The intention is that, with regard to the current invention, only the components A and B of the design are summarized, and the conclusion must be further interpreted as they also contain equivalents of these components.

Figure 1:
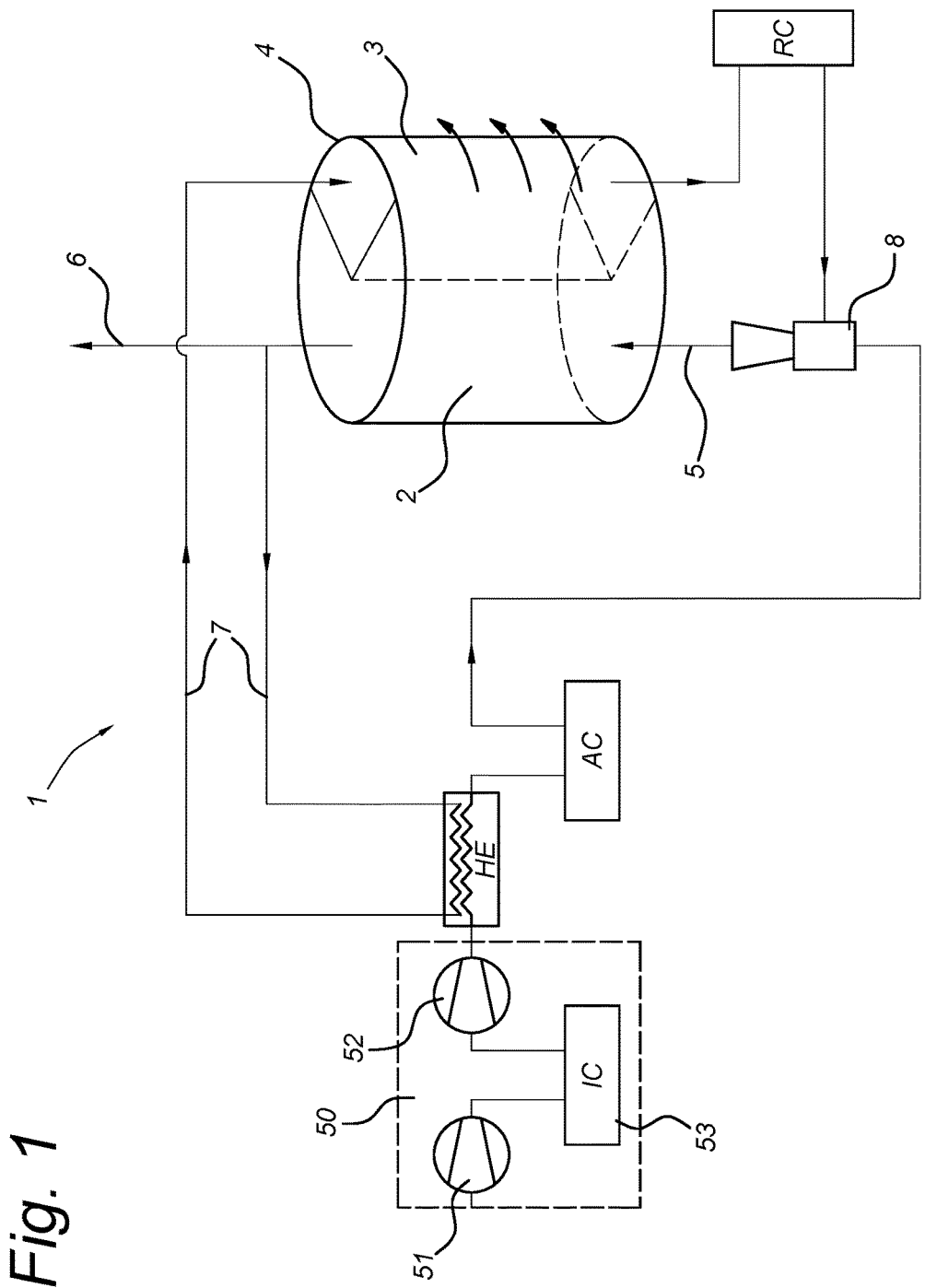
FIG. 1 shows a schematic image of a compressor installation with dryer according to the state of the art of technology.

FIG. 1 shows a known design, comprising a compressor installation with a dryer 1 for compressed gas. The dryer 1 comprises a pressure vessel with a drying zone 2 and a regeneration zone 3, a rotatable drum 4 in the pressure vessel, equipped with a regenerable drying agent, driving means for rotating the aforementioned drum so that the drying agent is successively conducted through the drying zone and the regeneration zone, an inlet 5 connected to the inlet side of the drying zone of the pressure vessel and provided for the transport of the compressed gas to be dried and an outlet 6 connected with an outlet side of the drying zone of the pressure vessel and provided for the expulsion of the dried compressed gas. The input gas to be dried is delivered by a compressor 50 that can include a first compression stage 51 and a second compression stage 52 and an intercooler (IC) 53. The supply line passes the compressed gas first along a heat exchanger (HE) and a cooling element (aftercooler AC). At the outlet 6 of the dryer there is a connection line 7 equipped to branch off a partial stream of the dried compressed gas. This partial stream is led through the heat exchanger HE for the warming using the heat present in the supply stream by compression, and then further conducted to the regeneration zone 3. After the regeneration, the partial stream is reintegrated with the supply stream of the compressed gas to be dried. This occurs via a cooling element with a condensation separator (Regeneration Cooler RC) and a venturi ejector 8.

Figure 2:
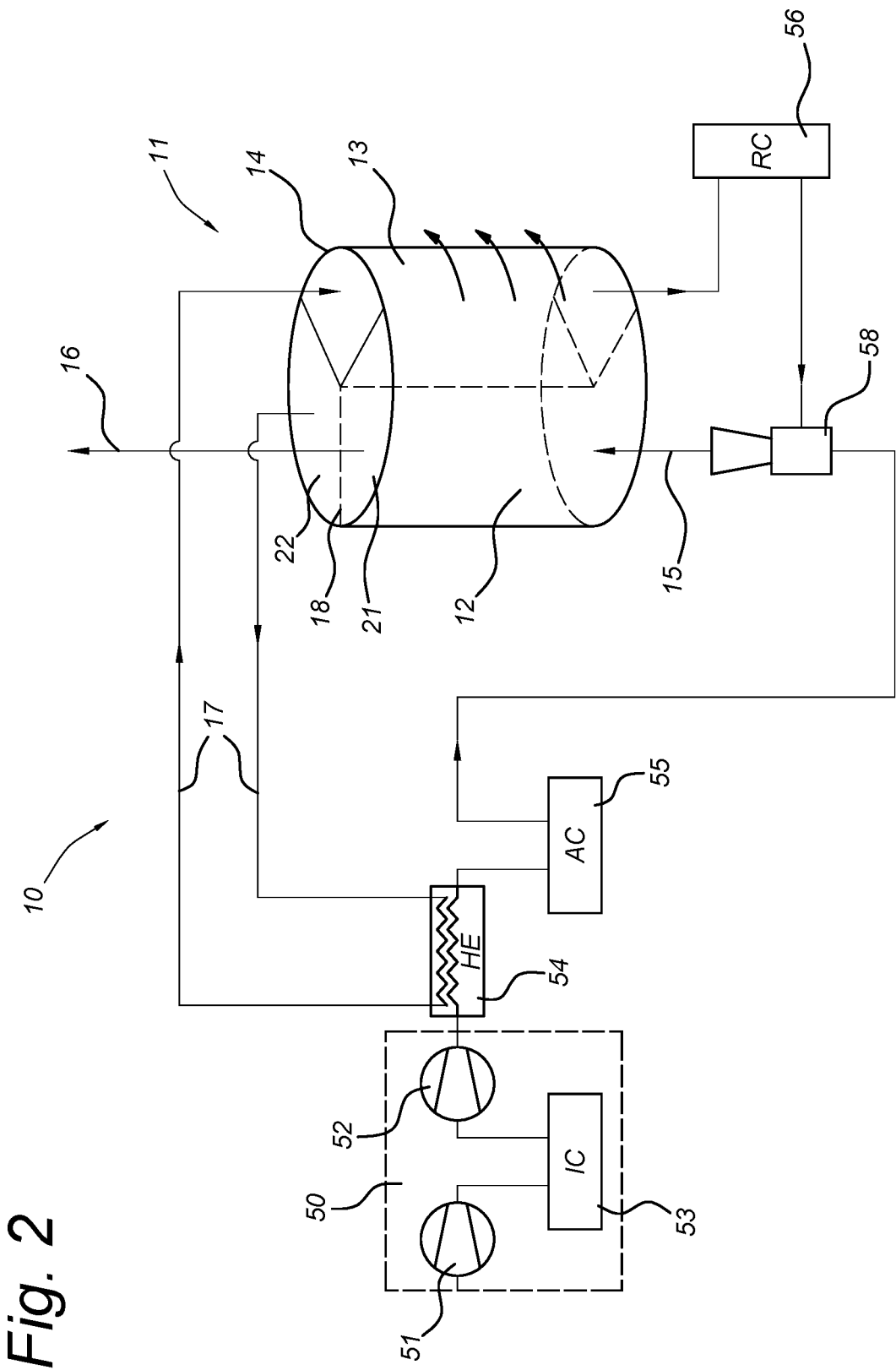
FIG. 2 shows a schematic image of a compressor installation with dryer according to the first design of the invention.

FIG. 2 shows a first design of a unit according to the invention, comprising a compressor installation 50 with a dryer 10 for compressed gas. The dryer 10 comprises a pressure vessel 11 containing a rotation symmetrical part in which a drying zone 12 and a regeneration zone 13 are defined, a drum 14, set up in the rotation symmetrical part and equipped with a regenerable drying agent, driving means for rotating the aforementioned drum in the rotation symmetrical part, meaning to rotate the drum 14 in the rotation symmetrical part or making the rotation symmetrical part rotate around a stationary drum 14, so that the drying agent successively moves through the drying zone and the regeneration zone. The rotation symmetrical part is preferably cylindrical, but this is not essential, other forms of rotation symmetrical parts are also possible. The dryer also contains an inlet 15 connected to an inlet side of the crying zone of the pressure vessel 11 and equipped for the supply of the compressed gas to be dried and an outlet 16 connected to an outlet side of the drying zone of the pressure vessel 11 provided for the expulsion of the dried compressed gas. The input gas to be dried is delivered by a compressor 50 that can include a first compression stage 51 and a second compression stage 52 and an intercooler (IC) 53. The supply line passes the compressed gas first along a heat exchanger (HE) 54 and a cooling element (aftercooler AC) 55. At the outlet 6 of the dryer there is a connection line 17 equipped to branch off a partial stream of the dried compressed gas. This partial stream is led through the heat exchanger 54 for the warming using the heat present in the supply stream by compression, and then further conducted to the regeneration zone 13. After the regeneration, the partial stream is reintegrated with the supply stream of the compressed gas to be dried. This occurs via a cooling element with a condensation separator (Regeneration Cooler RC) 56 and a venturi ejector 58, or other means of creating a pressure difference and maintaining the partial stream for regeneration, such as a blower, for example.

The outlet side of the drying zone is subdivided using a divider 18 into a first outlet zone 21 with which the outlet 16 is connected for the dried compressed gas, and a second outlet zone 22 with which the first connection line 17 is connected. This divider 18 is located within the volume of the pressure vessel 11 and provides for a separation of the stream of dried gas at the position where it is expelled from the drum 14 (meaning in the figures on the top side of the drum). In the design according to FIG. 2, the first outlet zone 21, seen in the direction of rotation of the drum, is located after the second outlet zone 22, but this is also possible in the reverse. The divider 18 can, for example, be designed as a wall or rib that extends in the radial direction and is formed on the top part of the pressure vessel, or as a mobile wall mounted on positioning units provided, or as a part of a separate element that is placed on top of the drum 14, for example as the heat exchanger described further.

FIG. 3a-c shows a comparison of the dryer according to the state of the art of technology (FIG. 3A) with some dryers according to the invention (FIG. 3b-d). For the known dryer in FIG. 3a, the partial stream for regeneration branches off from the outlet line 6.

In the design according to FIG. 3b, the dryer is divided into the regeneration zone 13, a cooling zone 19 that follows the regeneration zone 13 in the direction of rotation and the drying zone that follows the second outlet zone 22 in the direction of rotation and contains the first outlet zone 21. The dotted line 18 indicates the divider that divides up the drying zone. The partial stream flowing into the second outlet zone 22 is propelled to the regeneration zone 13 via the connection line 17 that is separated from the outlet 6, and a heating unit 24 (such as a heat exchanger 54). The connection line 17 and the heating unit 24 can be provided within the volume of the pressure vessel, as described elsewhere here. The partial stream of gas expelled in the first outlet zone 21 is transported to the outlet 16 of the dryer. The cooling zone 19 is supplied by a smaller partial stream from the adjacent part of the drying zone. This is known to the professional and is not explained further here.

In the design according to FIG. 3B, the regeneration zone 13 and the second outlet zone 22 have a scope of a sector of nearly 90°. The cooling zone 19 extends over a much smaller sector and the rest is formed by the first outlet zone 21, which thus extends over a greater sector than the second outlet zone. The scope of these zones can also be greater or smaller, as described elsewhere herein.

The design according to FIG. 3e is equivalent to that of FIG. 3b. One difference is that the first and second outlet zones are reversed, meaning that the first outlet zone 31 that is connected to the outlet 16, is located before the second outlet zone 32 in the rotation direction of the drum, which is connected with the connection line 27.

Figure 4:
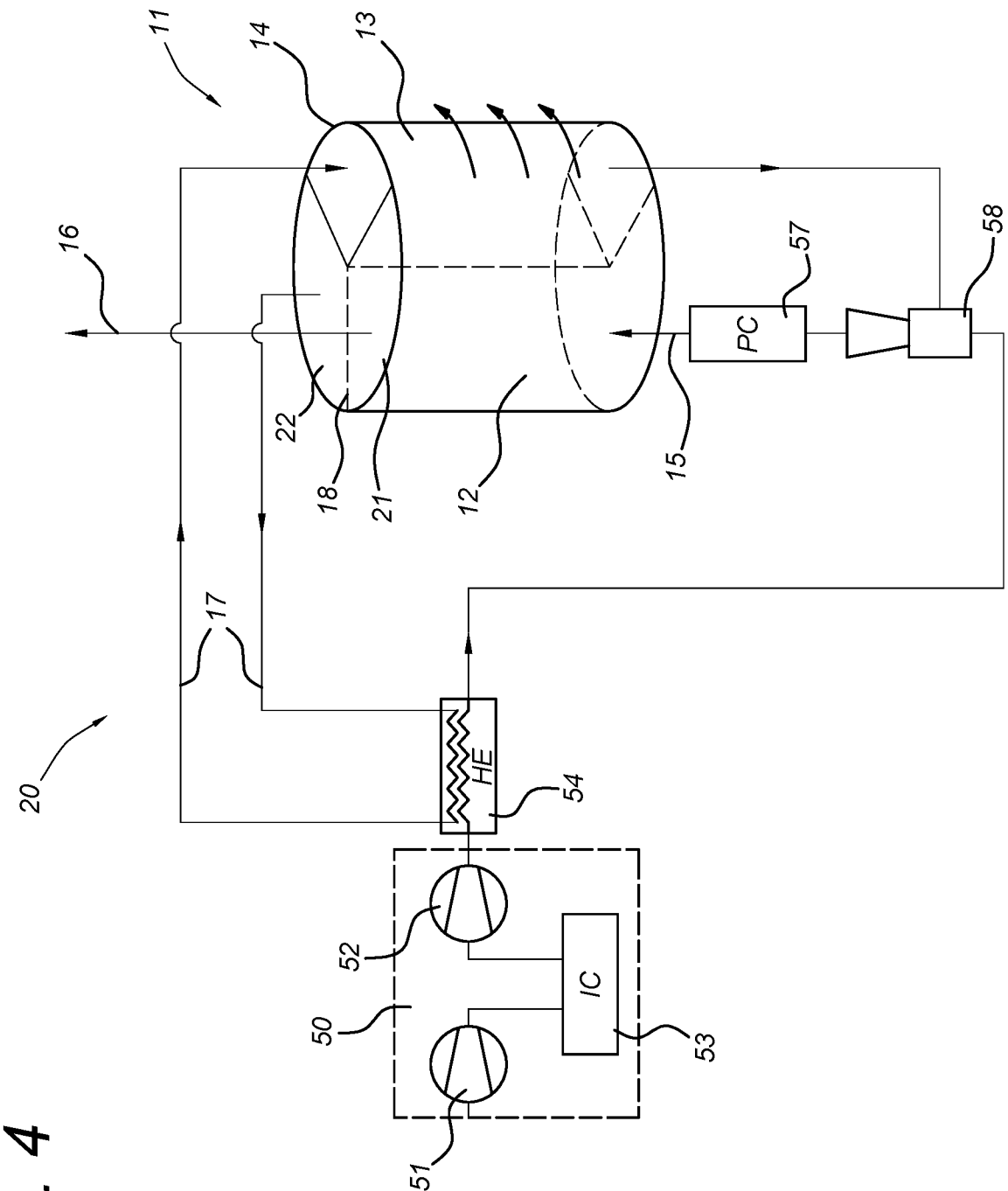
FIG. 4 shows a schematic image of a compressor installation with dryer according to a second design of the invention.

FIG. 4 shows a second design of an installation according to the invention, containing a compressor installation 50 with a dryer 20 for compressed gas. The dryer 20 contains a pressure vessel 11 comprising a symmetrically rotational part in which a drying zone 12 and a regeneration zone 13 are defined, a drum 15, set up in the symmetrical rotational part and equipped with a regenerable drying agent, driving means for rotating the aforementioned drum with regard to the symmetrical rotational part so that the drying agent is successively moved through the drying zone and the regeneration zone. The rotation symmetrical part is preferably cylindrical, but this is not essential, other forms of rotation symmetrical parts are also possible. The dryer also contains an inlet 15 connected to an inlet side of the crying zone of the pressure vessel 11 and equipped for the supply of the compressed gas to be dried and an outlet 16 connected to an outlet side of the drying zone of the pressure vessel 11 provided for the expulsion of the dried compressed gas. The input gas to be dried is delivered by a compressor 50 that can include a first compression stage 51 and a second compression stage 52 and an intercooler (IC) 53. The supply line passes the compressed gas first along a heat exchanger (HE) 54 and a cooling element 57. At the outlet 6 of the dryer there is a connection line 17 equipped to branch off a partial stream of the dried compressed gas. This partial stream is led through the heat exchanger 54 for the warming using the heat present in the supply stream by compression, and then further sent to the regeneration zone 13. After the regeneration, the partial stream is reintegrated with the supply stream of the compressed gas to be dried. This occurs via a venturi ejector 58 or other means of creating a pressure difference and maintaining the partial stream for regeneration, such as a blower, for example.

In the design according to FIG. 4 the combination of the main stream of compressed gas to be dried with the partial stream used for regeneration occurs before the cooling. The cooling can thus occur at mutually for both streams in the cooling element 57 (Process Cooler PC), that is located between the venturi ejector 58 and the inlet 15 of the pressure vessel 11. This cooling element 57 is preferably equipped with a condensation separator. In other designs, this cooling element 57 can also be integrated into the pressure vessel, more precisely on the bottom between the inlet 15 and the inlet side of the drying zone 12.

Just as in FIG. 2, in the design according to FIG. 4 The outlet side of the drying zone is subdivided using a divider 18 into a first outlet zone 21 with which the outlet 16 is connected for the dried compressed gas, and a second outlet zone 22 with which the first connection line 17 is connected. In the design according to FIG. 4, the first outlet zone 21, seen in the direction of rotation of the drum, is located after the second outlet zone 22, but this is also possible in the reverse, as described in FIG. 3.

Figure 5:
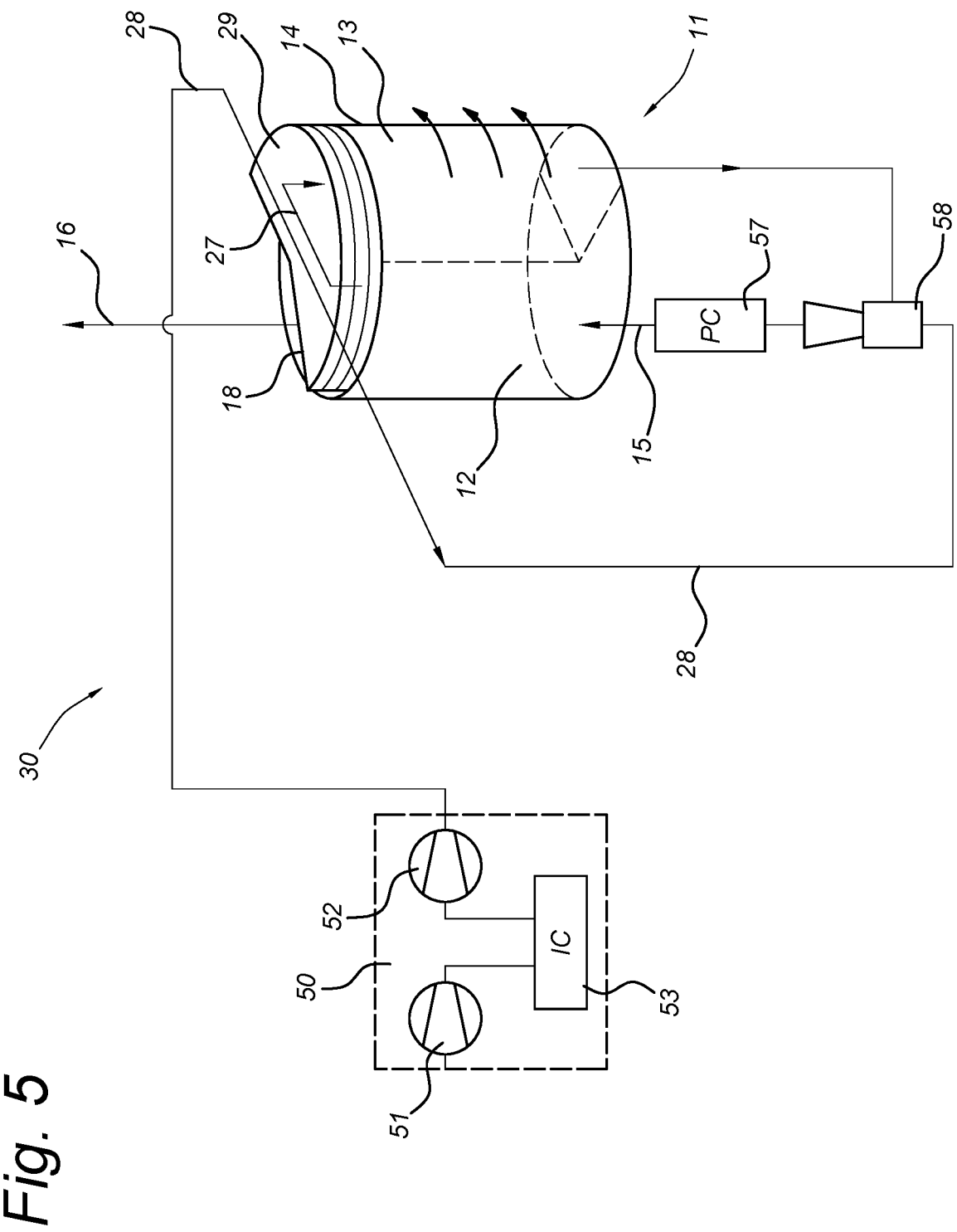
FIG. 5 shows a schematic image of a compressor installation with dryer according to a third design of the invention.

FIG. 5 shows a second design of an installation according to the invention, containing a compressor installation 50 with a dryer 30 for compressed gas. The dryer 30 contains a pressure vessel 11 comprising a symmetrically rotational part in which a drying zone 12 and a regeneration zone 13 are defined, a drum 14, set up in the symmetrical rotational part and equipped with a regenerable drying agent, driving means for rotating the aforementioned drum with regard to the symmetrical rotational part so that the drying agent is successively moved through the drying zone and the regeneration zone. The rotation symmetrical part is preferably cylindrical, but this is not essential, other forms of rotation symmetrical parts are also possible. The dryer also contains an inlet 15 connected to an inlet side of the crying zone of the pressure vessel 11 and equipped for the supply of the compressed gas to be dried and an outlet 16 connected to an outlet side of the drying zone of the pressure vessel 11 provided for the expulsion of the dried compressed gas. The input gas to be dried is delivered by a compressor 50 that can include a first compression stage 51 and a second compression stage 52 and an intercooler (IC) 53.

In the design according to FIG. 5, the supplied stream of compressed gas is first conducted through a heat exchanger 29 via a supply line 28, which is mounted at the top in the pressure vessel 11 and then further to the inlet 15 of the pressure vessel 11. The heat exchanger 29 is provided for heating the partial stream 27 for regeneration and in this design also forms the divider 18 and the first connection line 27, which separates the partial stream for regeneration from the stream of dried compressed gas conducted to the outlet 16 and redirected to the regeneration zone 13. In this design, the first connection line 27 and the heat exchanger 29 are thus integrated in to the pressure vessel 11.

In the design according to FIG. 5, the division of the drying zone 12 is as shown in FIG. 3c, more specifically, the first outlet zone 31 that is connected to the outlet 16, is located before the second outlet zone 32 in the rotation direction of the drum, which is connected with the connection line 27. In other designs, this may be reversed.

After the regeneration, the partial stream is reintegrated with the supply stream of the compressed gas to be dried. This occurs via a venturi ejector 58 or other means of creating a pressure difference and maintaining the partial stream for regeneration, such as a blower, for example. The design according to FIG. 5 is equivalent to that of FIG. 4: the combination of the main stream of compressed gas to be dried with the partial stream used for regeneration occurs before the cooling. The cooling can thus occur at mutually for both streams in the cooling element 57 (Process Cooler PC), preferably with a condensation separator, that is located between the venturi ejector 58 and the inlet 15 of the pressure vessel 11. In other designs, this cooling element 57 can also be integrated into the pressure vessel, more precisely on the bottom between the inlet 15 and the inlet side of the drying zone 12. This cooling element 57 can be a passive installation, in which cooling water is used as the cooling agent, which is usually available elsewhere in an industrial installation, or an active installation such as a chiller, or a combination thereof. In one variation of this invention, equivalent to FIG. 2, the main stream and the partial stream can be cooled separately before being combined using an aftercooler AC and a regeneration cooler RC respectively, whereby only the regeneration cooler RC is integrated into the pressure vessel.

Figure 6:
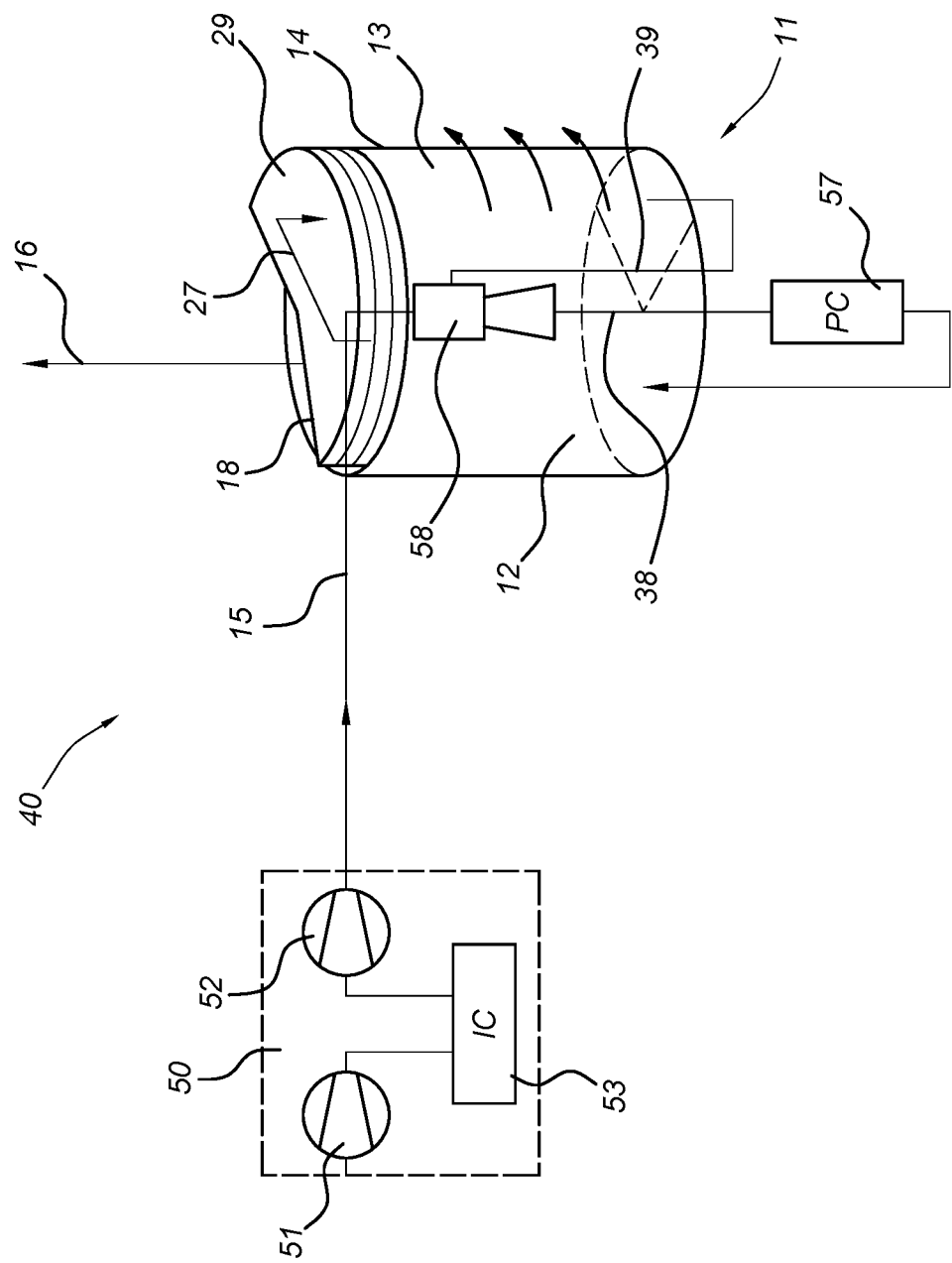
FIG. 6 shows a schematic image of a compressor installation with dryer according to a fourth design of the invention.

FIG. 6 shows a fourth design of an installation according to the invention, containing a compressor installation 50 with a dryer 40 for compressed gas. The dryer 40 contains a pressure vessel 11 comprising a symmetrically rotational part in which a drying zone 12 and a regeneration zone 13 are defined, a drum 14, set up in the symmetrical rotational part and equipped with a regenerable drying agent, driving means for rotating the aforementioned drum with regard to the symmetrical rotational part so that the drying agent is successively moved through the drying zone and the regeneration zone. The rotation symmetrical part is preferably cylindrical, but this is not essential, other forms of rotation symmetrical parts are also possible. The dryer also contains an inlet 15 on the pressure vessel 11 for the supply of the compressed gas to be dried and an outlet 16 on the pressure vessel 11 provided for the expulsion of the dried compressed gas. The input gas to be dried is delivered by a compressor 50 that can include a first compression stage 51 and a second compression stage 52 and an intercooler (IC) 53.

In the design according to FIG. 6, the supplied stream of compressed gas is first conducted through a heat exchanger 29 via a supply line 28, which is mounted at the top in the pressure vessel 11. The heat exchanger 29 is provided for heating the partial stream 27 for regeneration and in this design also forms the divider 18 and the first connection line 27, which separates the partial stream for regeneration from the stream of dried compressed gas conducted to the outlet 16 and redirected to the regeneration zone 13. In this design, the first connection line 27 and the heat exchanger 29 are thus integrated in to the pressure vessel 11.

In the design according to FIG. 6, the division of the drying zone 12 is as shown in FIG. 3c, more specifically, the first outlet zone 31 that is connected to the outlet 16, is located before the second outlet zone 32 in the rotation direction of the drum, which is connected with the connection line 27. In other designs, this may be reversed.

In the design according to FIG. 6, the inlet 15 for the compressed air to be dried is located at the level of the heat exchanger 29 and the supplied stream of compressed gas within the pressure vessel 11 is further conducted to the inlet side of the drying zone. This occurs, as shown in the figure, preferably via a central line or channel 38 through the middle of the drum 14. The venturi ejector 58 can also be integrated into this line 38, which suctions in the partial stream used for regeneration via a second central line or channel 39. In other designs, the main stream of compressed gas to be dried can also be conducted further within the pressure vessel via a line or channel along the outer mantle of the drum and the venturi ejector for combination of the main stream and the partial stream for regeneration can be installed in this line or channel. At the bottom of the drum, there is, comparable with FIGS. 4 and 5, there is a mutual cooling element 57 (process cooler PC) for cooling of the combined stream (main stream and regeneration partial stream), which is preferably integrated into the pressure vessel. In one variation of this invention, equivalent to FIG. 2, the main stream and the partial stream can be cooled separately before being combined using an aftercooler AC and a regeneration cooler RC respectively, whereby only the regeneration cooler RC is integrated into the pressure vessel. The cooling of the supply stream and combination of both streams then occurs outside of the pressure vessel.

Figure 7:
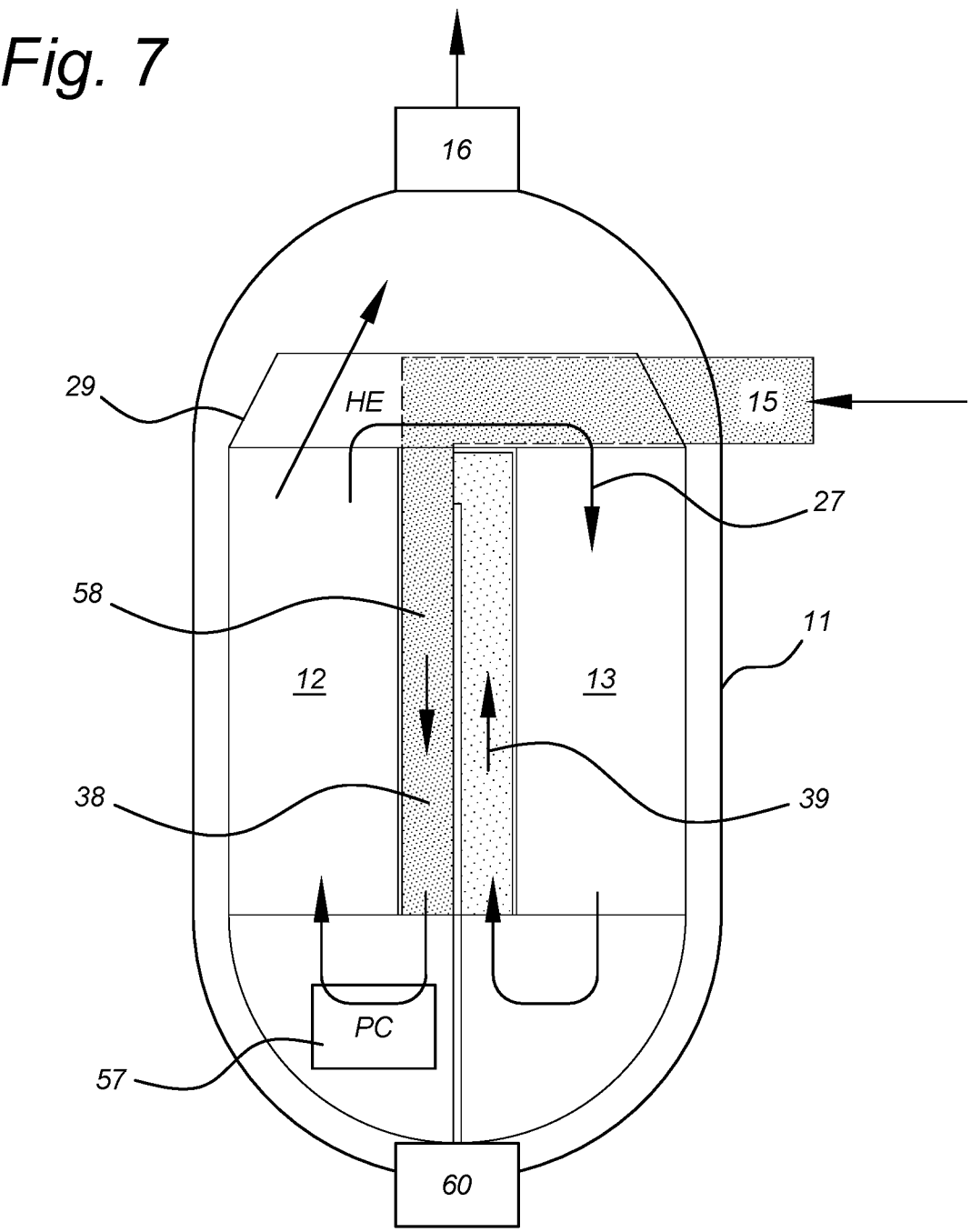
FIG. 7 shows a schematic cross-section of the pressure vessel of a dryer according to the fourth design.

In designs of the invention, such as the design according to FIG. 6, nearly all parts of the dryer 40 are integrated into the pressure vessel, more precisely the heat exchanger 29 that contains the first connection line 27, the connection 38 for the main stream from the heat exchanger 29 to the inlet side of the drying zone, the venturi ejector 58 and the cooling element 57 with condensation separator 60. In this way, a very compact dryer or drying installation can be designed, with only one inlet 15 and outlet 16 for compressed gas. FIG. 7 shows a design of this type of integrated dryer 40.

In the designs of the invention described above, the adjustable units can be provided for maintaining a pressure difference between the supply stream and the partial stream for regeneration, so that at least the flow of the partial stream can be regulated. These type of adjustable units can be, for example, designed so that the venturi ejector (58) has an adjustable opening and that the dryer includes an actuator for the operation of the adjustable opening. This actuator can be, for example, controlled by a control signal that is set by a control unit, which, for example, can evaluate one or more process parameters of the drying process for determining the control signal and as a result the position of the adjustable opening.

The designs described above are applicable to all designs in which a part of the dried compressed air exiting the drying zone is branched off and redirected to the regeneration zone, or a partial zone thereof. This also includes "full flow" designs in which the complete supply stream of compressed air to be dried is first conducted through the regeneration zone and then through the drying zone, whereby a part of the stream of dried gas ejected is branched off and heated for additional regeneration.

The heating unit for heating of the partial stream branched off for regeneration, as in the designs described, is preferably a heat exchanger using the heat inherently present in the compressed gas after compression. In alternative designs, one can also use other heating installations, possibly in combination with the aforementioned heat exchanger, such as, for example, an active electrical heating or a heat exchanger that absorbs heat from another industrial process, or a combination.

It is clear that the elements of the designs described above can be combined within the protective scope of this description.

The invention claimed is:

1. A dryer for compressed gas, comprising:
   a rotatable drum provided with a regenerable drying agent, the drum including a drying zone and a regeneration zone, an outlet side of the drum being subdivided into a first outlet zone and a second outlet zone, the first outlet zone and the second outlet zone being separated by a divider;
   driving means for the rotation of the drum so that the drying agent is moved successively through the drying zone and the regeneration zone;
   an inlet for the supply of compressed gas to the drying zone;
   an outlet connected to the first outlet zone for the discharge of dried compressed gas from the dryer; and
   a first connection line connected between the second outlet zone and the regeneration zone for sending a partial stream of the dried compressed gas to the regeneration zone.

2. The dryer according to claim 1, wherein the first outlet zone, seen from the direction of rotation of the drum, is located in front of the second outlet zone.

3. The dryer according to claim 1, wherein the first outlet zone, seen from the direction of rotation of the drum, is located next to the second outlet zone.

4. The dryer according to claim 1, wherein the dryer comprises positioning elements for the positioning of the first outlet zone, the second outlet zone and/or the divider on the outlet zone of the drying zone.

5. The dryer according to claim 1, wherein the regeneration zone extends over a sector of 45° to 135° of the drum.

6. The dryer according to claim 1, wherein the first outlet zone extends over a sector of 90° to 180° of the drum.

7. The dryer according to claim 1, wherein the second outlet zone extends over a sector of 45° to 135° of the drum.

8. The dryer according to claim 1, wherein the regeneration zone and the second outlet zone extends over sectors that are nearly of equal size.

9. The dryer according to claim 1, wherein the drum further comprises a cooling zone for cooling the drum, whereby the cooling zone, seen in the direction of rotation of the drum, is located behind the regeneration zone and in front of the drying zone.

10. The dryer according to claim 1, wherein the first connection line is provided with a heating element for heating the partial stream diverted for regeneration.

11. The dryer according to claim 10, wherein the rotatable drum, the first connection line and the heating element are located within a pressure vessel.

12. The dryer according to claim 10, wherein the heating element is a heat exchanger, provided for heating the partial stream tapped-off for regeneration with the compressed gas to be dried supplied to the dryer.

13. The dryer according to claim 12, wherein the inlet for the supply of the compressed gas to be dried to the dryer is located at the level of the heat exchanger and within the pressure vessel there is a second connection line for the supply of the compressed gas to be dried from the heat exchanger to the inlet side of the drying zone.

14. The dryer according to claim 13, wherein the second connection line is provided with a venturi ejector for combining the partial stream used for regeneration with the stream of the compressed gas to be dried.

15. The dryer according to claim 14, wherein the venturi ejector has an adjustable opening and the dryer includes an actuator for the operation of the adjustable opening.

16. The dryer according to claim 1, wherein the dryer comprises a cooling unit for cooling of the supplied compressed gas to be dried, whereby the cooling element is located within a pressure vessel on the inlet side of the drying zone.

17. The dryer according to claim 1, wherein the dryer further comprises a cooling element for cooling of the gas to be dried that is sent to the drying zone, using a first coolant, and the cooling element comprises a first cooling circuit, provided for the cooling of the gas to be dried with a first coolant, and a second cooling circuit downstream of the first cooling circuit, provided for further cooling of the gas to be dried with a second coolant of a lower temperature than the first coolant.

18. The dryer according to claim 17, wherein the aforementioned first and second coolants of the aforementioned cooling element are the same coolants and the dryer comprises an additional second circuit for cooling of the second coolant before the second cooling circuit.

19. The dryer according to claim 1, wherein the dryer comprises a pressure vessel and a de-mister, the de-mister installed on the inlet side of the drying zone for the removal of droplets from the gas to be dried, the pressure vessel comprising a maintenance hatch in a wall of the pressure vessel at the location of the de-mister.

20. The dryer according to claim 1, wherein the power supply for rotating the aforementioned drum comprises a motor provided with a start/stop switch.

21. The dryer according to claim 20, wherein the start/stop switch is provided to switch the motor on and off, so that the motor can be switched between a maximum rotation speed of the motor and standstill.

22. A compressor installation, comprising a compressor and a dryer according to claim 1.

* * * * *